(12) United States Patent
Srinivasan (10) Patent No.: US 7,660,879 B2
(45) Date of Patent: Feb. 9, 2010

(54) SYSTEM AND METHOD FOR APPLICATION DEPLOYMENT SERVICE

(76) Inventor: Ananthan Bala Srinivasan, 1610 Sanchez St., San Francisco, CA (US) 94131

( * ) Notice: Subject to any disclaimer, the term of this patent is extended or adjusted under 35 U.S.C. 154(b) by 370 days.

(21) Appl. No.: 11/132,883

(22) Filed: May 19, 2005
(Under 37 CFR 1.47)

(65) Prior Publication Data
US 2007/0011328 A1    Jan. 11, 2007

Related U.S. Application Data

(60) Provisional application No. 60/572,883, filed on May 20, 2004.

(51) Int. Cl.
*G06F 15/177* (2006.01)
(52) U.S. Cl. .................. 709/221; 709/205; 718/101
(58) Field of Classification Search ........... 709/217, 709/220, 224, 226, 242, 221, 223, 204, 205; 718/101
See application file for complete search history.

(56) References Cited

U.S. PATENT DOCUMENTS

| | | | |
|---|---|---|---|
| 5,212,789 A | 5/1993 | Rago | |
| 5,546,582 A * | 8/1996 | Brockmeyer et al. | 709/201 |
| 5,555,418 A | 9/1996 | Nilsson | |
| 5,642,504 A | 6/1997 | Shiga | |
| 5,835,911 A | 11/1998 | Nakagawa et al. | |
| 6,195,765 B1 | 2/2001 | Kislanko | |
| 6,226,784 B1 | 5/2001 | Holmes | |
| 6,493,871 B1 | 12/2002 | McGuire et al. | |
| 6,515,968 B1 | 2/2003 | Combar | |
| 6,631,407 B1 * | 10/2003 | Mukaiyama et al. | 709/223 |
| 6,658,659 B2 | 12/2003 | Hiller et al. | |
| 6,947,986 B1 | 9/2005 | Huang | |
| 6,983,446 B2 | 1/2006 | Charisius | |
| 6,983,449 B2 | 1/2006 | Newman | |
| 6,990,527 B2 | 1/2006 | Spicer | |
| 7,000,190 B2 | 2/2006 | Kudukoli | |
| 7,134,085 B2 | 11/2006 | Austin | |
| 7,146,418 B2 * | 12/2006 | Bahl | 709/224 |
| 7,155,745 B1 * | 12/2006 | Shin et al. | 726/27 |
| 7,249,174 B2 * | 7/2007 | Srinivasa et al. | 709/223 |
| 7,526,479 B2 * | 4/2009 | Zenz | 707/8 |
| 2002/0078170 A1 * | 6/2002 | Brewer et al. | 709/218 |

(Continued)

OTHER PUBLICATIONS

"Distributed Transaction Processing: The XA Specification," Dec. 1991, pp. 1-80, X/Open CAE Specification, X/Open Document No. XO/CAE/91/300, The Open Group, X/Open Company Ltd.

(Continued)

*Primary Examiner*—Saleh Najjar
*Assistant Examiner*—Marie Georges Henry
(74) *Attorney, Agent, or Firm*—Fliesler Meyer LLP (57) ABSTRACT

A transactional distribution infrastructure enables multiple participants to work together to deploy changes to an executing context. Embodiments can prepare new changes to executing applications based on a copy of the running context or domain rather than the actual running domain. Performing the changes on a copy of the running domain rather than on the actual running domain allows the changes to be examined, therefore providing an opportunity to detect errors and prevent the changes from causing failures on the domain.

17 Claims, 4 Drawing Sheets

U.S. PATENT DOCUMENTS

| | | |
|---|---|---|
| 2004/0015950 A1 | 1/2004 | Dutta |
| 2004/0060044 A1 | 3/2004 | Das |
| 2004/0168169 A1 | 8/2004 | Ebro |
| 2005/0034103 A1 | 2/2005 | Volkov |
| 2005/0152344 A1 | 7/2005 | Chiu |
| 2005/0160395 A1 | 7/2005 | Hughes |
| 2005/0210124 A1 | 9/2005 | Chua |
| 2005/0262495 A1 | 11/2005 | Fung |

OTHER PUBLICATIONS

International Search Report and Written Opinion for PCT/US05/17518, mailed Aug. 7, 2009, 10 pages.

* cited by examiner

SYSTEM AND METHOD FOR APPLICATION DEPLOYMENT SERVICE

CLAIM OF PRIORITY

This application claims the benefit of:

U.S. Provisional Patent Application No. 60/572,883, entitled SYSTEM AND METHOD FOR APPLICATION DEPLOYMENT SERVICE by Ananthan Bala Srinivasan, filed on May 20, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The present application is related to the following co-pending United States patents and Patent Applications, which patents/applications are assigned to the owner of the present invention, and which patents/applications are incorporated by reference herein in their entirety:

U.S. patent application Ser. No. 10/847,960, entitled PRODUCTION REDEPLOYMENT THROUGH APPLICATION VERSIONING, by Priscilla C. Fung et al., filed on May 18, 2004, and U.S. patent application Ser. No. 10/848,228, entitled ADMINISTRATION MODE FOR SERVER APPLICATIONS, by Priscilla C. Fung et al., filed on May 18, 2004,

FIELD OF THE INVENTION

The current invention relates generally to managing one or more servers, and more specifically to a system and method for providing an application deployment service.

BACKGROUND

In a clustered or distributed application server environment, some form of data replication is useful in order to distribute configuration and deployment information from an administration (Admin) server to one or more managed servers within its domain. The typical requirements for such a data replication process is to be able to distribute data items over point-to-point connections, i.e., using TCP for example, that provides for a measure of flow control. Data replication allows managed servers to persistently cache data on local disks, and speeds server startup by reducing the amount of data to be transferred. Storing data locally on each server also allows independent server startup and/or restart when the Admin server is unavailable, unreachable, or in a failed condition.

However, updates and changes to a domain configuration need to be distributed to the servers to which the changes are applicable in a manner that maintains the consistency of configuration of the domain. Some changes need to be consistent across the entire domain while others need to be consistent within clusters. Consistency is also crucial to the application deployment and redeployment process because services like availability, failover, load-balancing and in-memory replication are scoped to a cluster and not the entire domain.

DETAILED DESCRIPTION

In accordance with embodiments, there are provided transactional distribution mechanisms and methods for deploying changes made to a copy of an application context to the actual executing application context. These mechanisms and methods can enable multiple participants that are part of a domain, comprised of an administration server and one or more managed servers, to coordinate and control deployment of changes to an application context. An embodiment prepares new changes based on a copy of the running context or domain rather than the actual running domain. Performing the changes on a copy of the executing context rather than on the actual executing context allows the changes to be examined prior to deploying the changes in the actual executing context, thereby providing an opportunity to detect errors and prevent the changes from causing failures on the domain. Transactional distribution mechanism embodiments can include a multiple-phase commit process, such as described herein with reference to examples illustrated by FIGS. 2-4, between the administration server and the at least one target server that may be used to coordinate and control deployment of the at least one change in the domain.

In an embodiment, a method for deploying changes to a domain is provided. The method includes receiving at least one change to a copy of an application context executing on at least one target server managed by an administration server. The at least one change may be performed on a copy of the application context rather than the application context executing in the domain. Performing changes on a copy of the application context can provide the capability to examine the at least one change to detect errors that would cause failures in the domain prior to deploying the at least one change on the application context executing at least one target server. The at least one change is deployed to the application context executing on the at least one target server in the domain. A multiple-phase commit process implementing a transactional framework between the administration server and the at least one target server may be used to deploy the at least one change in the domain.

As used herein, the term "topology" is intended to describe a distributed architecture. As used herein, the term "artifacts" includes a topology of the domain and applications. The term domain is intended to mean a management unit comprising an administrative server and at least one managed server. A domain may include servers that may be grouped into clusters as illustrated in domain 100 of FIG. 1. As used herein, the term application is intended to be broadly construed to include any application capable of executing in the domain, and may include without limitation any application, program or process resident on one or more computing devices, network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services.

While the present invention is described with reference to an embodiment in which changes made to a copy of an application context are deployed to the executing application context in a managed server domain, the present invention is not limited to changes in application contexts, but may be practiced by embodiments deploying changes to other contexts, i.e., operating systems, system programs and the like without departing from the scope of the embodiments claimed.

Figure 1:
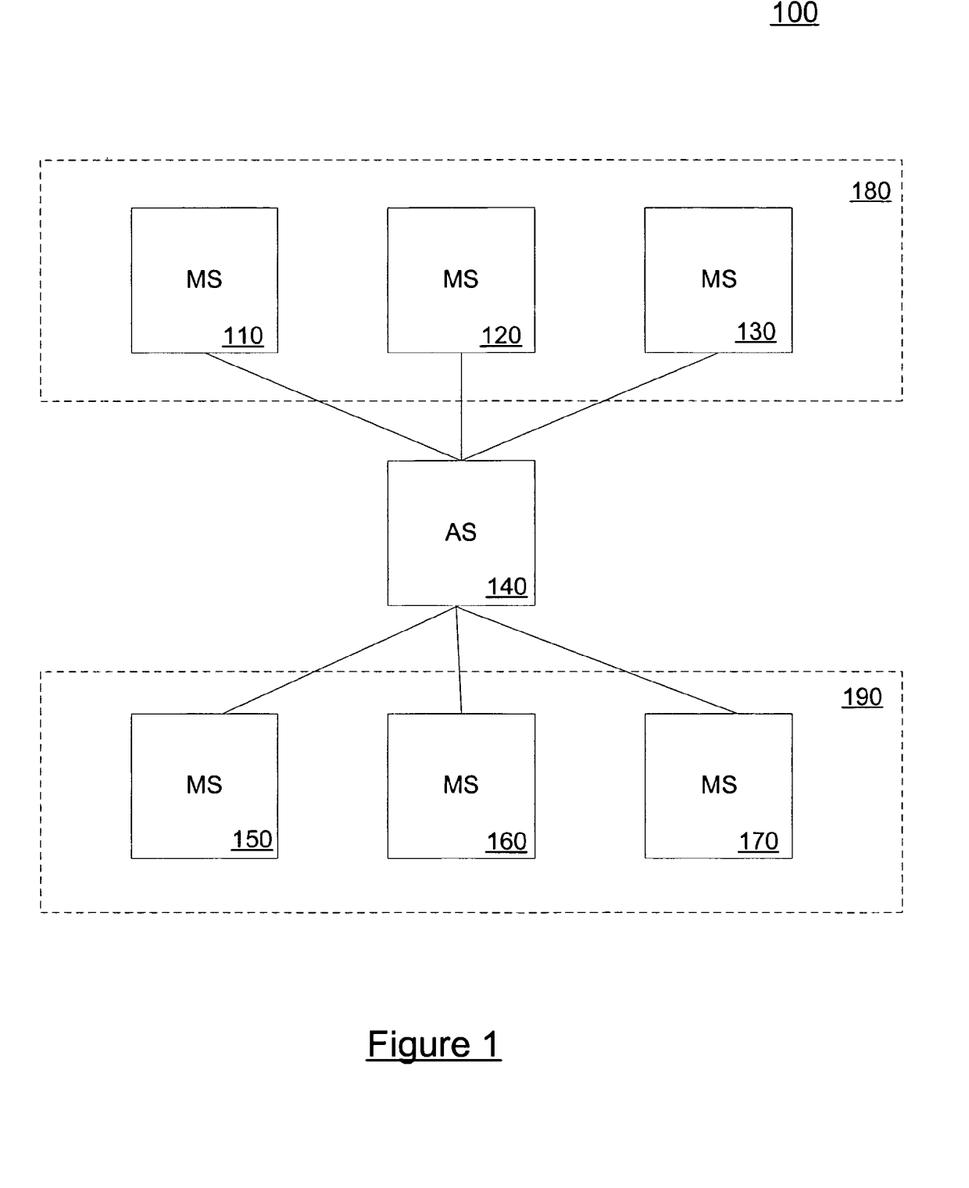
FIG. 1 is an illustration of a domain in an embodiment.

FIG. 1 illustrates a domain in an embodiment. As shown in FIG. 1, a Domain 100 includes managed or target servers 110, 120, 130, 150, 160 and 170, administration server 140, and clusters 180 and 190. In domain 100, cluster 180 includes servers 110, 120 and 130 and cluster 190 includes 150, 160 and 170. Though illustrated with three managed servers, a cluster may contain any number of managed servers. The administration server may exchange information with any of the managed servers. The servers of domain 100 comprise a distributed system architecture with the administration server ensuring the managed servers have the same information regarding domain configuration and applications.

In one embodiment, the domain 100 includes a distributed configuration subsystem and a deployment subsystem. The configuration subsystem manages systems, adds clusters, and adds global resources (such as a database). The deployment subsystem handles applications and associated tasks. Both subsystems collaborate and are consumers of the underlying deployment service. The deployment service distributes configuration artifacts and files from the administration server to managed server.

In one embodiment, the system topology includes a deployment subsystem, configuration subsystem and deployment service distributed over the domain. On an administration server, when changes are made to the domain by means of a deployment request, the deployment request can be received via the deployment subsystem or the configuration subsystem. The appropriate subsystem creates an artifact and will contact other subsystem(s) to determine if anything needs to be added to the artifact. This is done because when either a server, application or some other entity is being deployed into a domain, it requires changes to the configuration and an addition to the domain. Thus, the two subsystems need to work together to provide a system snapshot of the overall domain configuration. Once completed, the administration server transmits a deployment package to the appropriate managed server(s). Once the package is received by the managed server(s), the managed server processes the package. In one embodiment, the managed server process the package in the same order as the administration server did. Thus, the appropriate subsystem receives a signal indicating a package has been received and that the subsystem should perform any necessary processing to validate this package. The same signal is sent to the other subsystem.

Figure 2:
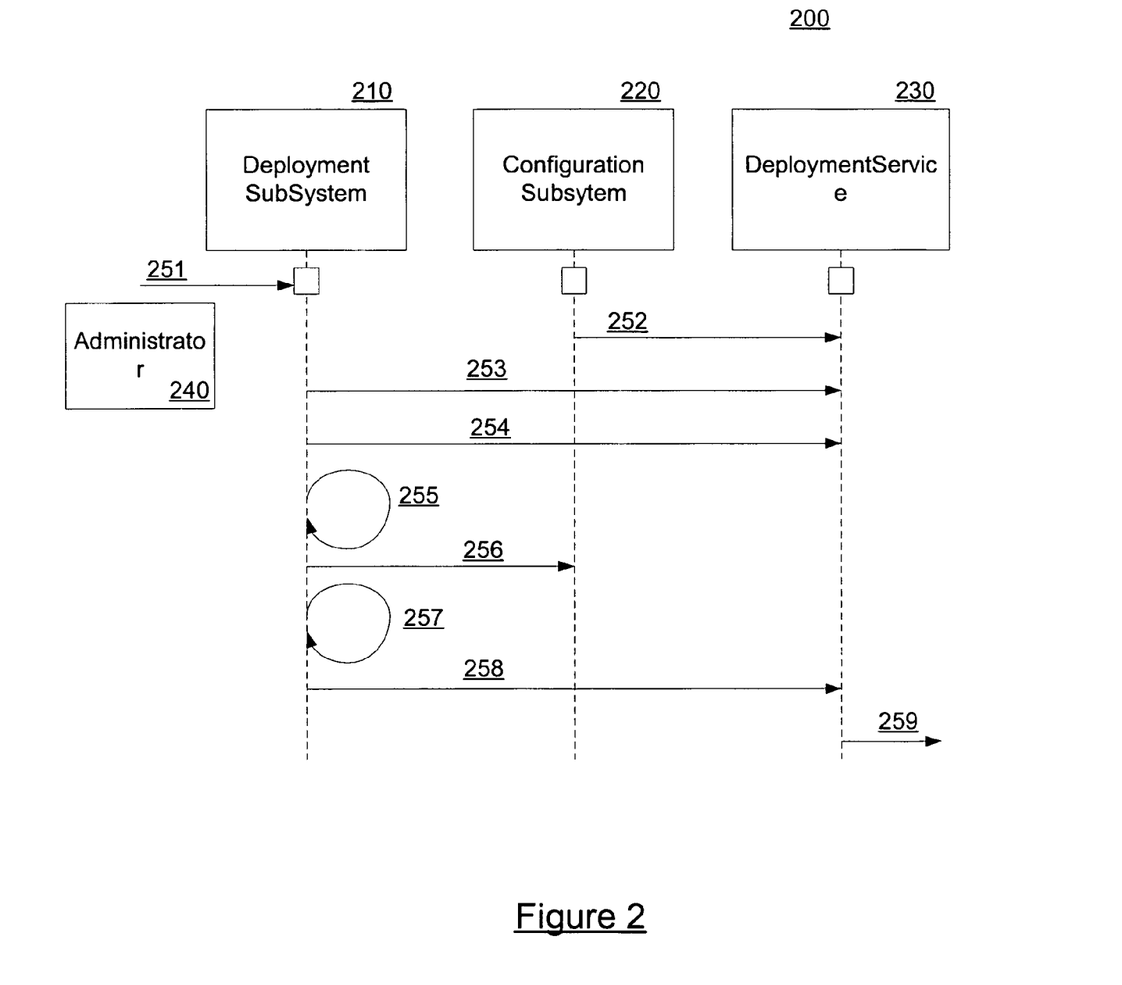
FIG. 2 is an illustration of an administration server interaction process during deployment in an embodiment.
Figure 3:
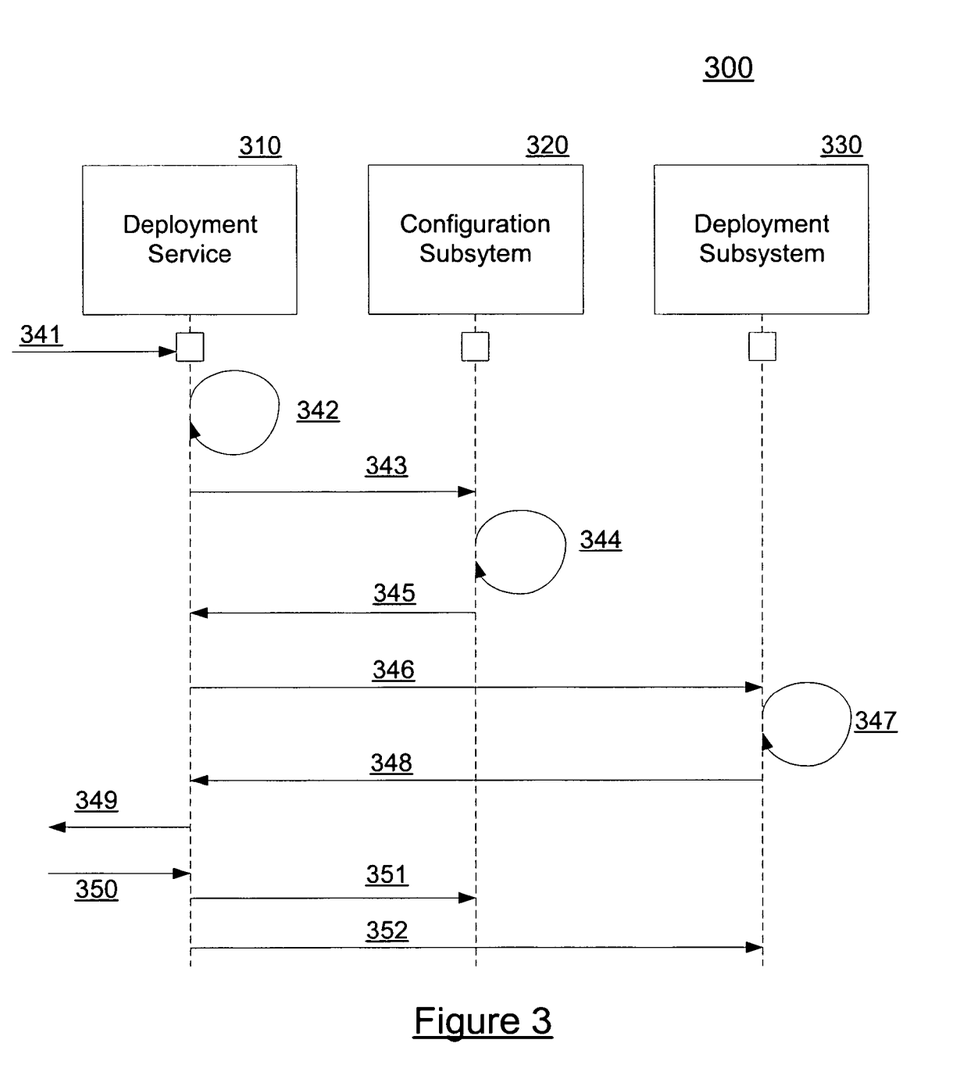
FIG. 3 is an illustration of a managed server interaction process during deployment in an embodiment.
Figure 4:
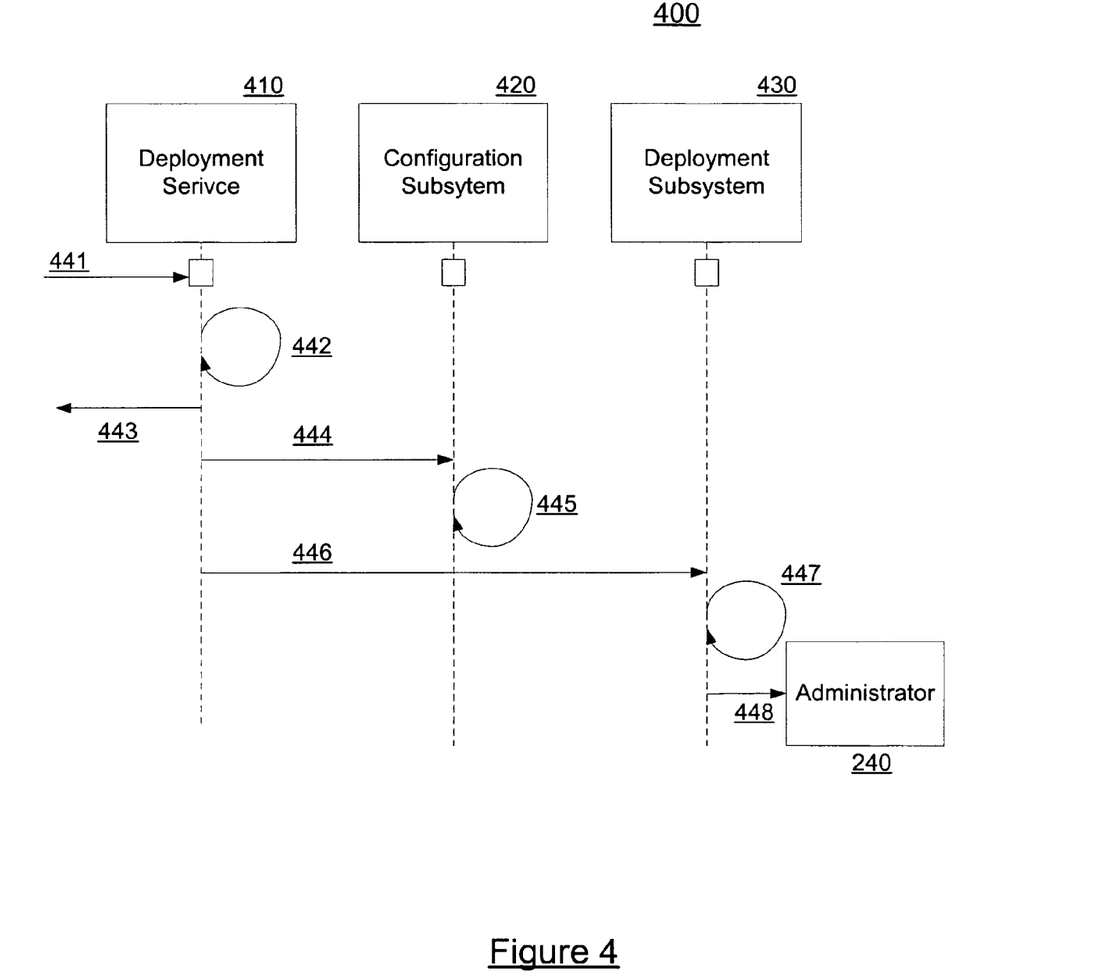
FIG. 4 is an illustration of an administration server interaction process during deployment in an embodiment.

FIGS. 2-4 illustrate control sequences that a deployment request may undergo as the deployment request is processed in an embodiment. The process illustrated shows interactions with the configuration subsystem and the deployment subsystem of the administration server and managed servers. The deployment subsystem of FIGS. 2-4 is based on a new application deployment request. Thus, the configuration subsystem is contacted first and initiates work at certain points in the deployment process. The scope of the present invention also includes server deployment requests, at which the process begins with the configuration subsystem. Thus, if the deployment involves adding a new server, the deployment request is received through the configuration subsystem. If the deployment involves adding an application, the request is received through the deployment subsystem.

FIG. 2 illustrates a process of an administration server at the start of a deployment request involving deployment of an application through deployment APIs. As shown in FIG. 2, a Process 200 involves actions by deployment subsystem 210, configuration subsystem 220, deployment service 230 and administrator 240, each of which may be embodied within administration server 140 of FIG. 1. In one embodiment, the deployment service 230 is configured to distribute configuration artifacts from the administration server to the managed servers.

In one embodiment, the deployment subsystem 210 performs work related to deployment of new applications and implements JSR-88 deployment APIs, BaseDeploymentProvider and DeploymentServiceCallbackHandler. The configuration subsystem 220 performs work relating to global changes, servers, and management control and implements ConfigurationDeploymentProvider and DeploymentServiceCallbackHandler. DeploymentService 230 comprises the infrastructure to perform transactional processing and implements DeploymentRequestFactory, DataTransferHandlerManager, DeploymentServiceOperations and ChangeDescriptorFactory.

In an embodiment, administrator 240 first initiates a deployment of an application. The admin server 140 receives a deployment request at the deployment subsystem 210 via the deployment API in step (251). In one embodiment, the deployment request may take the form of deploy(app2, targets), wherein app2 represents the application to be deployed and targets are the managed servers at which the application is to be deployed. The deployment subsystem 210 informs the configuration subsystem 220 of the deployment request. Then, both the configuration subsystem 220 and deployment subsystem 210 register deployment service callback handlers with deployment service 230 in step (252) and step (253), respectively. In step (252) the configuration subsystem 220 sends a register command with parameters of "config" and configCallbackHandler. In step (253) the deployment subsystem 210 sends a register command with parameters of "deployment" and deploymentCallbackHandler. Registering their respective DeploymentServiceCallbackHandlers with the deployment service 230 allows deployment subsystem 210 and configuration subsystem 220 to receive any callbacks sent up by the deployment service 230.

After registering, the deployment subsystem 210 requests the creation of a deployment request from the deployment service in step (254). In one embodiment, whichever subsystem receives the deploy request in step (252) will initiate the request to create a deployment request. In one embodiment, the request is a container into which each of subsystems will add work that they need done to complete the deployment. In one embodiment, the deployment service 230 generates the deployment request using via the DeploymentRequestFactory. The deployment subsystem 210 then creates a base deployment job entry in step (255). Once the job entry is generated, the deployment subsystem 210 signals the configuration subsystem 220 to add to the generated job entry in step (256). If the configuration subsystem 220 has anything to add to the job entry, the deployment subsystem 210 makes the additions in step (257). The deployment subsystem 210 then sends the job entry to the deployment service 230 in step (258). In response, the deployment service 230 encodes the job entry into a package ("the deployment request package")

and sends the deployment request package to appropriate target servers in step (259). For example, if the deployment request is to be sent to a cluster of three servers, than three instances of the deployment request package will be generated and distributed.

FIG. 3 illustrates a processing of a target server that is the subject of a deployment in an embodiment. As shown in FIG. 3, a Process 300 involves actions by deployment service 310, configuration subsystem 320 and deployment subsystem 330, all located on the target (managed) server. In one embodiment, the deployment subsystem 330 performs work related to deployment of new applications and implements DeploymentReceiver. The configuration subsystem 320 performs work relating to global changes, servers, and management control and implements Deployment Receiver. The DeploymentService 310 contains the infrastructure to do transactional work and implements DeploymentReceiver Coordinator.

In operation, the target server receives the deployment request package from the administration server in step (341). In one embodiment, the deployment request is received from the administration server through a DeploymentReceiversCoordinator. Once the deployment request is received, the deployment service 310 of the target server generates a context ("the deployment context") from the parameters of the request package in step (342). In one embodiment, the deployment context is a view of the environment in the managed server from the point of view of the configuration. The context is a copy of the running system domain, upon which the changes are to be made. The context is not yet active. This allows for the system to determine whether the deployment will negatively affect the running system by first applying the changes to the copy, or context version. Thus, the context running system is examined, or validated, before it is actually deployed. Validation of the changed domain may involve, after looking at the configuration, determining whether the deployment can be performed successfully, are the required external resources available, have all required services been set-up, and whether the prepare phase can be executed successfully. In one embodiment, the validation includes each managed server retrieving information and content from the deployment package and providing the information and content to the managed server modules. The modules then perform the validation of the package contents. The modules may include messaging subsystems, web server subsystems, and other subsystems that determine how functionality is delivered to the application.

Once the context is prepared, the deployment service 310 instructs the configuration subsystem 320 to prepare for the deployment in step (343). Upon receipt of the prepare instruction, the configuration subsystem 320 performs prepare related operations and updates to the context as necessary in step (344). The configuration subsystem 320 then responds to the target server deployment service 310 to indicate that the prepare request is acknowledged in step (345). Upon receiving the acknowledgement signal from the configuration subsystem 320, the deployment service 310 repeats this process with the deployment subsystem 330. Thus, the deployment service 310 instructs the deployment subsystem 330 to prepare for the deployment in step (346). Upon receipt of the prepare instruction, the deployment subsystem 330 performs prepare related operations and updates the context as necessary in step (347). The deployment subsystem 330 then responds to the target server deployment service 310 to indicate that the prepare request is acknowledged in step (348). After the systems of the target server have acknowledged the "prepare for deployment" signals, the target server replies to the administration server in step (349). The target server then waits to receive a reply from the administration server before continuing. Operation of the administration server between the time of step (349) and step (350) of process 300 is illustrated and discussed with reference to FIG. 4. The target server eventually receives a reply containing a commit signal from the administration server in step (350). Once the commit signal is received, the deployment service 310 of the target server sends commit commands to the configuration subsystem 320 in step (351) and deployment subsystem 330 in step (352). In one embodiment, if in step (345) or step (348) one or more of the managed server subsystems return a failed acknowledge signal, the managed server sends a fail signal back to the administration server in step (349). The deployment process for the particular deployment request then completes.

FIG. 4 illustrates processing of an administration server from the point that prepare acknowledge signals are received from target servers in an embodiment. As shown in FIG. 4, a Process 400 involves actions by deployment subsystem 430, configuration subsystem 420, deployment service 430, all within an administration server. In one embodiment, the deployment subsystem 430, configuration subsystem 420 and deployment service 410 are similar to those illustrated and described in reference to FIG. 2.

In operation, the administration server receives prepare acknowledgments from the target servers in step (441). Once all target servers have responded, the administration server's deployment service 410 acts to save a record of the commit in step (442). In one embodiment, if the administration server should fail, the saved record of the commit will allow the deployment to proceed from this point rather than starting the entire process over from step (251) in FIG. 2. Once the record is saved, the administration server distributes commit signals to all the involved target servers in step (443). In another embodiment, if the administration server receives one or more prepare failure signals in step (441), it will mark the operation as failed and inform the target servers of the failed operation in step (443).

After distributing the commit signals, the administration server sends a deployment successful signal to the configuration subsystem 420 in step (444). In response, the configuration subsystem 420 saves the new configuration file config.xml in step (445). The configuration subsystem 420 also saves the old configuration file at some well known location. Next, the administration server sends a deployment successful signal to the deployment subsystem 430 in step (446). Upon receiving the deployment successful signal, the deployment subsystem 430 then saves any state managed by the deployment subsystem 430 for the particular deployment in step (447). The deployment subsystem 430 then returns a signal indicating the deployment was successful to the administrator 240.

In one embodiment, the present invention includes a transactional distribution infrastructure that enables multiple participants that are part of a deployment change to work together to create a deployment context. The infrastructure prepares new changes based on a copy of the running context or domain rather than the actual running domain by employing a two phase commit process implemented using a transactional framework between components of an administration server and one or more managed servers in a domain. Performing the changes on a copy of the running domain rather than on the actual running domain allows the changes to be examined, therefore providing an opportunity to detect errors and prevent the changes from causing failures on the domain.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, implementing a deployment service for a domain.

The invention claimed is:

1. A method for deploying changes to a domain, said method comprising:

receiving a deployment request by an administration server, wherein the deployment request requests at least one change on at least one of a plurality of servers in a system domain;

maintaining an active application context executing on each of the plurality of servers, wherein the active application context is a view of a running system domain in terms of configuration;

generating, by the administration server, a deployment package instance for each of the plurality of servers based on the deployment request, said deployment package instance containing the change, and sending, by the administration server, the deployment package instance to each of the plurality of servers prior to committing the change;

generating an inactive copy of the active application context on each of the plurality of servers in response to receiving the deployment package instance;

applying the change contained in the deployment package instance to the inactive copy of the active application context at each of said plurality of servers;

examining the change applied to the inactive copy at each of the plurality of servers by detecting any errors caused by the change being applied to the inactive copy;

transmitting an acknowledgement by each of the plurality of servers if the change is validated after being examined, wherein said each server waits to receive a reply from the administration server before continuing with the change;

receiving an acknowledgement from each of the plurality of servers to the administration server, the acknowledgement indicating that the plurality of servers are prepared to accept the at least one change, and upon receiving the acknowledgement then sending a command by the administration server to commit the change to the plurality of servers; and wherein, after receiving the command to commit the change, the plurality of servers deploy the change to the active application context.

2. The method of claim 1, further comprising:

discontinuing deployment of the at least one change if a failed acknowledgement is received from any component of the at least one server.

3. The method of claim 1, further comprising:

testing the at least one change prior to deploying the at least one change on the application context executing on the at least one server.

4. A machine-readable storage medium storing one or more sequences of instructions for deploying changes to a domain, which instructions, when executed by one or more processors, cause the one or more processors to carry out the steps of:

receiving a deployment request by an administration server, wherein the deployment request requests at least one change on at least one of a plurality of servers in a system domain;

maintaining an active application context executing on each of the plurality of servers, wherein the active application context is a view of a running system domain in terms of configuration;

generating, by the administration server, a deployment package instance for each of the plurality of servers based on the deployment request, said deployment package instance containing the change, and sending, by the administration server, the deployment package instance to each of the plurality of servers prior to committing the change;

generating an inactive copy of the active application context on each of the plurality of servers in response to receiving the deployment package instance;

applying the change contained in the deployment package instance to the inactive copy of the active application context at each of said plurality of servers;

examining the change applied to the inactive copy at each of the plurality of servers by detecting any errors caused by the change being applied to the inactive copy;

transmitting an acknowledgement by each of the plurality of servers if the change is validated after being examined, wherein said each server waits to receive a reply from the administration server before continuing with the change;

receiving an acknowledgement from each of the plurality of servers to the administration server, the acknowledgement indicating that the plurality of servers are prepared to accept the at least one change, and upon receiving the acknowledgement then sending a command by the administration server to commit the change to the plurality of servers; and wherein, after receiving the command to commit the change, the plurality of servers deploy the change to the active application context.

5. The machine-readable storage medium of claim 4, further comprising instructions for carrying out the step of:
discontinuing deployment of the at least one change if a failed acknowledgement is received from any component of the at least one server.

6. The machine-readable storage medium of claim 4, further comprising instructions for carrying out the step of:
testing the at least one change prior to deploying the at least one change on the application context executing on the at least one server.

7. An administration server for deploying changes to a domain, the administration server comprising:
a processor; and
one or more stored sequences of instructions which, when executed by the processor, cause the processor to carry out the steps of:
receiving a deployment request by an administration server, wherein the deployment request requests at least one change on at least one of a plurality of servers in a system domain;
maintaining an active application context executing on each of the plurality of servers, wherein the active application context is a view of a running system domain in terms of configuration;
generating, by the administration server, a deployment package instance for each of the plurality of servers based on the deployment request, said deployment package instance containing the change, and sending, by the administration server, the deployment package instance to each of the plurality of servers prior to committing the change;
wherein each of the plurality of servers generates an inactive copy of the active application context in response to receiving the deployment package instance, apply the at least one change contained in the deployment package instance to the inactive copy of the active application context at each of said plurality of servers, examine the change applied to the inactive copy at each of the plurality of servers by detecting any errors caused by the change being applied to the inactive copy, and transmit an acknowledgement by each of the plurality of servers if the change is validated after being examined, wherein said each server waits to receive a reply from the administration server before continuing with the change; and
receiving an acknowledgement from each of the plurality of servers to the administration server, the acknowledgement indicating that the plurality of servers are prepared to accept the change, and upon receiving the acknowledgement then sending a command by the administration server to commit the change to the plurality of servers; and wherein, after receiving the command to commit the change, the plurality of servers deploy the change to the active application context.

8. The method of claim 1, further comprising:
after distributing commit signals, sending a deployment successful signal to a configuration subsystem, wherein the configuration subsystem saves a new configuration file; and
sending a deployment successful signal to a deployment subsystem, wherein the deployment subsystem saves state managed by the deployment subsystem and returns a signal indicating deployment success to the administration server.

9. The machine readable storage medium of claim 4, the instructions further comprising:
after distributing commit signals, sending a deployment successful signal to a configuration subsystem, wherein the configuration subsystem saves a new configuration file; and
sending a deployment successful signal to a deployment subsystem, wherein the deployment subsystem saves state managed by the deployment subsystem and returns a signal indicating deployment success to the administration server.

10. The administration server of claim 7, the stored sequences of instructions further comprising:
after distributing commit signals, sending a deployment successful signal to a configuration subsystem, wherein the configuration subsystem saves a new configuration file; and
sending a deployment successful signal to a deployment subsystem, wherein the deployment subsystem saves state managed by the deployment subsystem and returns a signal indicating deployment success to the administration server.

11. The method of claim 1, further comprising:
after receiving a commit signal, receiving a deployment successful signal at a configuration subsystem, wherein the configuration subsystem saves a new configuration file; and
receiving a deployment successful signal at a deployment subsystem, wherein the deployment subsystem saves state managed by the deployment subsystem and returns a signal indicating deployment success to the administration server.

12. The machine-readable storage medium of claim 4, the instructions further comprising:
after receiving a commit signal, receiving a deployment successful signal at a configuration subsystem, wherein the configuration subsystem saves a new configuration file; and
receiving a deployment successful signal at a deployment subsystem, wherein the deployment subsystem saves state managed by the deployment subsystem and returns a signal indicating deployment success to the administration server.

13. The target server of claim 7, the stored sequences of instructions further comprising:
after receiving a commit signal, receiving a deployment successful signal at a configuration subsystem, wherein the configuration subsystem saves a new configuration file; and receiving a deployment successful signal at a deployment subsystem, wherein the deployment subsystem saves state managed by the deployment subsystem and returns a signal indicating deployment success to the administration server.

14. The method of claim 1, wherein if the administration server receives an prepare failure signal from at least one of the plurality of servers, the administration server marks the deployment request as failed and informs the plurality of servers of a failed operation.

15. The method of claim 1, wherein the administration server saves a record of commit after having received acknowledgements from each of the plurality of servers, such that if the administration server fails, the saved record will allow the deployment to proceed from the commit instead of restarting the sending of the deployment request to each of said plurality of servers.

16. The method of claim 1, wherein examining the change applied to the inactive copy further includes:

examining the configuration after the change has been applied to the inactive copy and determining whether deployment request can be performed successfully based on whether required external resources are available to be accessed and whether required services have been set up and whether the prepare phase can be executed successfully.

17. The method of claim 1, wherein examining the change applied to the inactive copy further includes:

each server in the plurality of servers retrieving content from the deployment package instance and providing the content to managed server modules, wherein the modules perform the validation of the deployment package instance, wherein said managed server modules include one or more of the following: messaging subsystems, web server subsystems and other subsystems that determine how functionality is delivered to the application.

* * * * *

UNITED STATES PATENT AND TRADEMARK OFFICE
CERTIFICATE OF CORRECTION

PATENT NO. : 7,660,879 B2
APPLICATION NO. : 11/132883
DATED : February 9, 2010
INVENTOR(S) : Ananthan Bala Srinivasan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 634 days.

Signed and Sealed this

Thirtieth Day of November, 2010

David J. Kappos
*Director of the United States Patent and Trademark Office*